(12) United States Patent
Levine et al.

(10) Patent No.: US 7,559,154 B2
(45) Date of Patent: Jul. 14, 2009

(54) TAPE MEASURE

(75) Inventors: Steven R. Levine, Mooresville, NC (US); James Alan Weir, Cornelius, NC (US); Hamilton Sean Michael Whitney, Troutman, NC (US); Matthew R. Shute, Charlotte, NC (US); James M. Burry, Troutman, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/550,070

(22) Filed: Oct. 17, 2006

(65) Prior Publication Data
US 2007/0101599 A1      May 10, 2007

Related U.S. Application Data

(60) Provisional application No. 60/728,173, filed on Oct. 19, 2005.

(51) Int. Cl.
*G01B 3/10* (2006.01)
(52) U.S. Cl. .............................. 33/769; 33/755; 33/761
(58) Field of Classification Search .................. 33/761, 33/765, 769, 755, 759, 760
See application file for complete search history.

(56) References Cited

U.S. PATENT DOCUMENTS

| 1,138,483 | A | * | 5/1915 | Johnston ...................... 33/769 |
| 1,402,589 | A | | 1/1922 | Farrand |
| 1,730,199 | A | * | 10/1929 | Farrand .................... 242/396.6 |
| 1,811,945 | A | * | 6/1931 | Lange .......................... 33/761 |
| 2,050,941 | A | | 8/1936 | Farrand |
| 3,006,574 | A | | 10/1961 | Hardy |
| 4,092,780 | A | | 6/1978 | Trethewey et al. |
| 4,756,087 | A | | 7/1988 | Sing |
| 4,907,348 | A | | 3/1990 | Hubbard, Jr. |
| 4,972,600 | A | | 11/1990 | Nosek |
| 5,044,089 | A | | 9/1991 | Petkovic et al. |
| 5,110,092 | A | * | 5/1992 | Blaha et al. ......... 254/134.3 FT |
| 5,201,495 | A | * | 4/1993 | Crates et al. ........ 254/134.3 FT |

(Continued)

FOREIGN PATENT DOCUMENTS

DE          3912069 A1    10/1990

OTHER PUBLICATIONS

European Search Report from corresponding European patent application No. GB0620794.8 dated Jan. 8, 2007.

*Primary Examiner*—Yaritza Guadalupe-McCall
(74) *Attorney, Agent, or Firm*—Dennis J. Williamson; Matthew W. Witsil; Moore & Van Allen PLLC

(57) ABSTRACT

The tape measure may consist of a relatively large tape blade. To accommodate a large blade the tape measure housing is formed as a hollow annulus having an open central core where the blade is wound about the core of the annular housing. Because the housing has a central opening it can be easily carried in one hand. The device also includes a locking mechanism for locking the tape in an extended position and a rewind mechanism for rewinding the tape back into the housing. The rewind mechanism may comprise a belt drive, opposed springs with a cam lock, a linear spring compressed by a gear drive, a motor driven gear drive, a flat spring and gear drive or a magnetic drive.

31 Claims, 9 Drawing Sheets

U.S. PATENT DOCUMENTS

| | | |
|---|---|---|
| 5,440,820 A | 8/1995 | Hwang |
| 5,471,761 A | 12/1995 | Cheng |
| 5,539,994 A * | 7/1996 | Milden ................. 33/760 |
| 5,768,797 A | 6/1998 | Trevino |
| 5,875,987 A | 3/1999 | Pullen |
| 6,226,886 B1 | 5/2001 | Lamond et al. |
| 6,243,964 B1 | 6/2001 | Murray |
| 6,282,808 B1 | 9/2001 | Murray |
| 6,295,740 B1 | 10/2001 | Mitchell |
| 6,324,769 B1 | 12/2001 | Murray |
| 6,361,021 B1 * | 3/2002 | Brennan ............. 254/134.3 FT |
| 6,416,040 B1 * | 7/2002 | Bergman ............ 254/134.3 FT |
| RE37,824 E | 9/2002 | Pullen |
| 6,499,226 B1 | 12/2002 | Reda et al. |
| 6,513,791 B1 * | 2/2003 | Yates ................. 254/134.3 FT |
| 6,598,311 B2 | 7/2003 | Noon |
| 6,643,947 B2 | 11/2003 | Murray |
| 6,662,463 B2 | 12/2003 | Lee |
| 6,691,426 B1 | 2/2004 | Lee et al. |
| D506,400 S * | 6/2005 | Ziebart ....................... D10/74 |
| 7,293,734 B1 * | 11/2007 | Kantner ................... 242/395.1 |
| 7,374,150 B2 * | 5/2008 | Wiesemann et al. . 254/134.3 FT |
| 2002/0004993 A1 | 1/2002 | Usami |
| 2002/0129510 A1 | 9/2002 | Hsieh |
| 2007/0272905 A1 * | 11/2007 | Ziebart et al. ....... 254/134.3 FT |
| 2008/0301967 A1 * | 12/2008 | Sharp .......................... 33/769 |

* cited by examiner

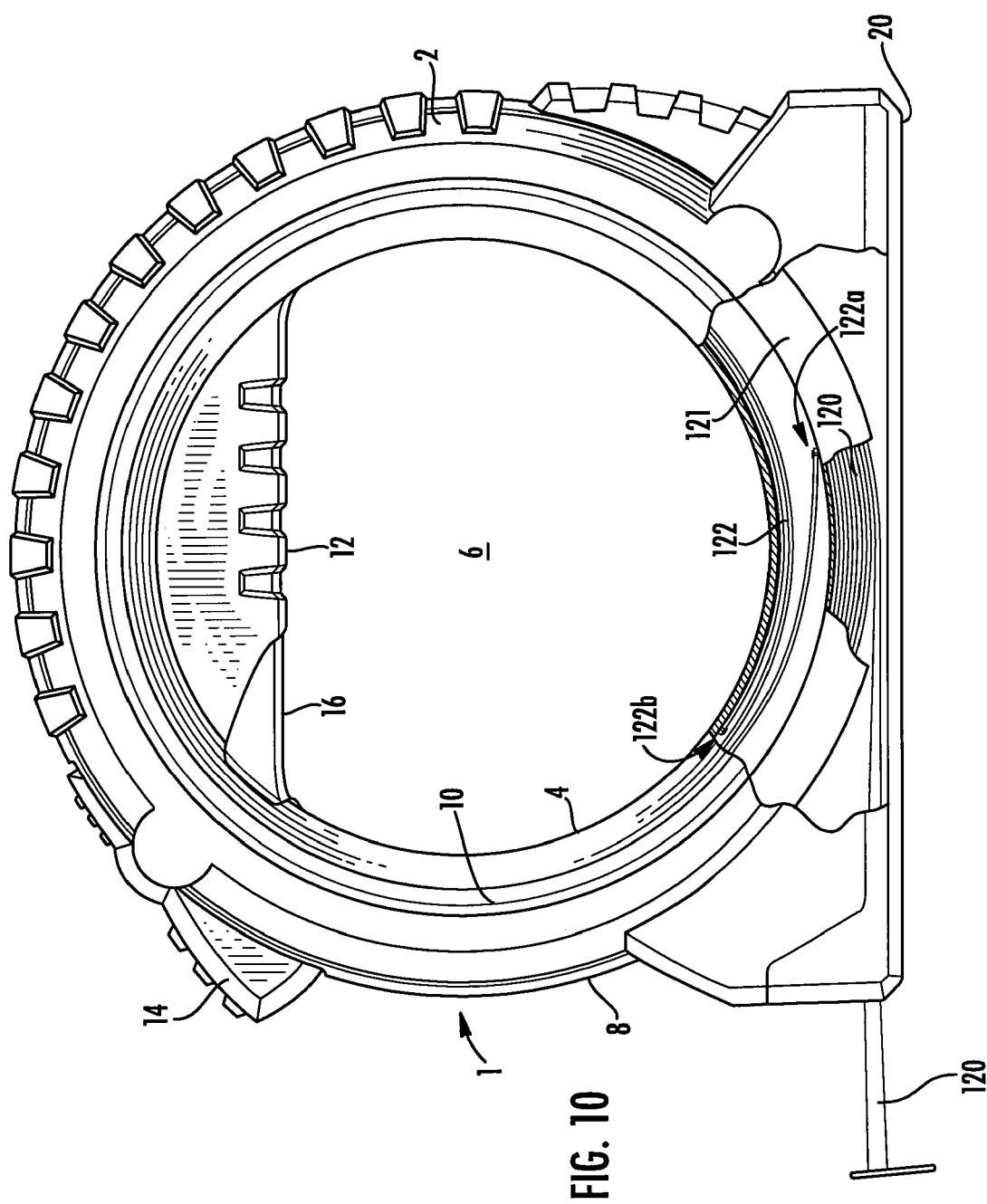

TAPE MEASURE

CROSS REFERENCE TO RELATED APPLICATIONS

This application claims the benefit of priority under 35 U.S.C. § 119(e) to the filing date of U.S. Provisional Application 60/728,173 filed on Oct. 19, 2005, which is incorporated herein by reference in its entirety.

BACKGROUND OF THE INVENTION

The invention relates generally to a tape measures and more particularly to a tape measure suitable for use with a large tape blade.

Tape measures as are known consist of a tape blade typically formed of steel, woven fabric or other material that allows the blade to be wound in a housing. The tapes are typically extended from the housing manually and retracted into the housing automatically by a torsion spring that is located inside of a hub around which the tape is wound. A brake may be provided to hold the tape in an extended position and offset the retraction force exerted by the spring. Steel blades are typically formed with an arcuate or other involute cross-section that allows the tape to extend from the housing some distance unsupported. The distance the tape can extend from the housing unsupported is known as standout.

While increased standout is viewed as a positive feature on tape blades, standout is limited by constraints on the size and weight of the tape blade. Specifically, users desire a tape measure that can be easily carried and used. Known constructions of tape measures, where a wound spring is used internally of the wound blade, limit the length, width, thickness and rigidity of the tape blade because as the size of the tape blade increases the size of the spring must also increase in order to be able to wind the bigger tape blade. Accordingly, the size of the housing must also increase to accommodate the larger blade and spring. As the size of the housing increases the tape measures become difficult to carry and use, especially with one hand.

Thus an improved tape measure, tape measure housing and rewind mechanism are desired that are especially suitable for large tape measures.

SUMMARY OF THE INVENTION

The tape measure of the invention consists of a tape blade that may be 1.5 to 2 inches in width and that may extend to 100 feet when fully extended. The blade may be made of steel and have a cross-section shape that maximizes its standout. To accommodate such a large blade the tape measure housing is formed as a hollow annulus having an open central core where the blade is wound about the core of the annular housing. Because the housing has a central opening it can be easily carried in one hand. The device also includes a locking mechanism for locking the tape measure in an extended position and a rewind mechanism for rewinding the tape back into the housing. The rewind mechanism may comprise a belt drive, opposed springs with a cam lock, a linear spring compressed by a gear drive, a motor driven gear drive, a flat spring and gear drive or a magnetic drive.

BRIEF DESCRIPTION OF THE DRAWINGS

FIGS. 2 through 7, 9 and 10 are partial cut-away side views showing various rewind mechanisms for rewinding the tape in the embodiment of the tape measure shown in FIG. 1.

DETAILED DESCRIPTION OF EMBODIMENTS OF THE INVENTION

Figure 1:
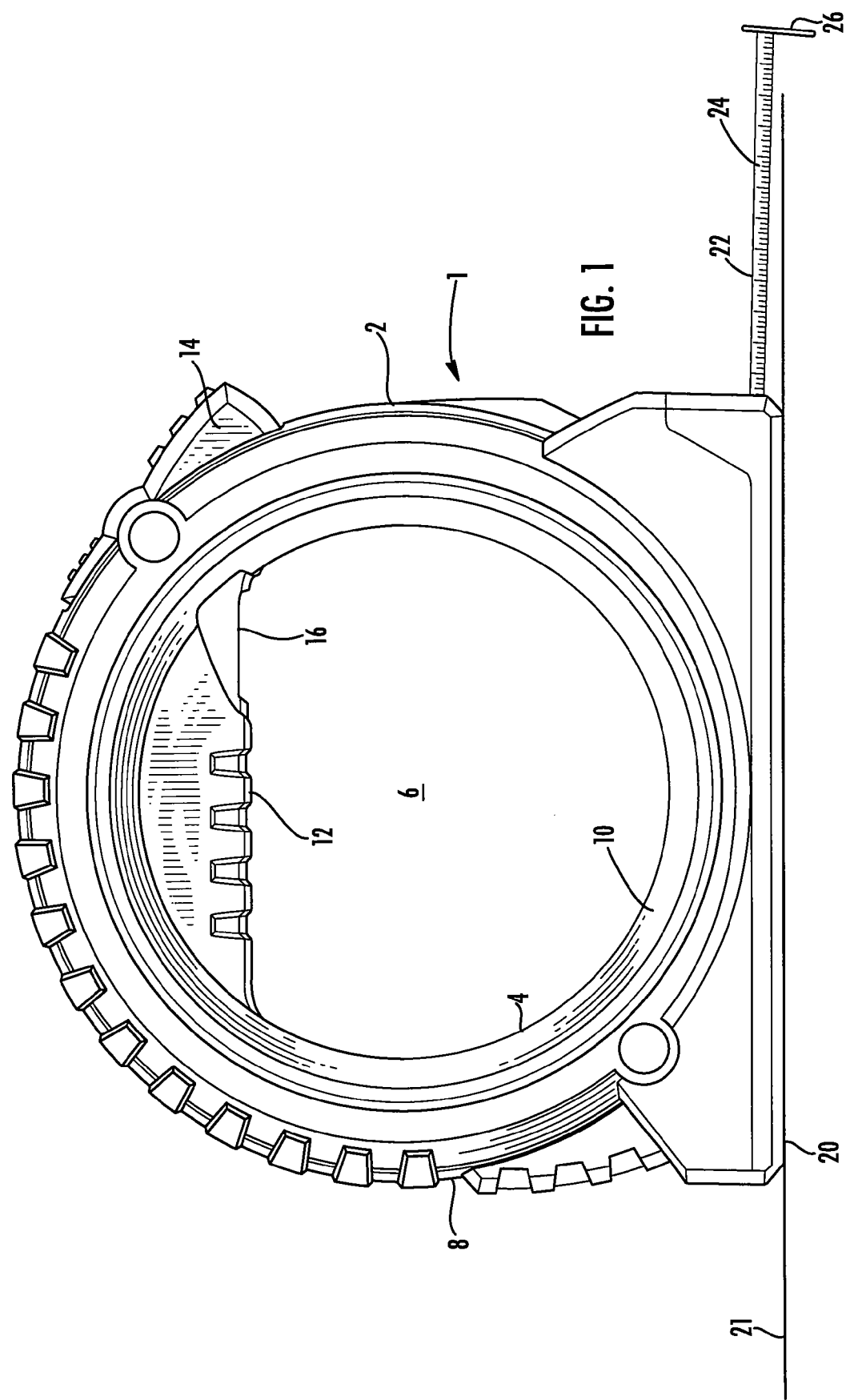
FIG. 1 is a side view of one embodiment of the tape measure of the invention.

Referring to FIG. 1 the tape measure of the invention is shown generally at 1 and comprises a housing 2 having an annular shape defined by a generally circular inner wall 4 that defines an internal void 6. The housing 2 has a generally circular outer wall 8 where the outer and inner walls are spaced by side walls 10 a distance such that a user can grip the housing. A handle portion 12 is formed on the housing to facilitate the gripping of the tape measure and a brake lever 14 and rewind lever 16 are located adjacent the handle such that the levers may be manipulated by one hand. It is contemplated that the tape measure will be gripped by an end user extending their fingers through void 6 to grip handle portion 12 much like a suitcase handle. The outer wall 8 is formed with a flat surface 20 such that the tape measure can be placed on a surface 21 to stand upright as shown in FIG. 1.

The blade 22 extends from the housing through an aperture located near the flat surface 20. Blade 22 may be constructed of steel or other material that allows the blade to be wound within housing 2. In one embodiment blade 22 is formed with an arcuate or other involute shaped cross-section such that the tape measure will obtain a desired standout. The tape measure will have a width of approximately 1.5 to 2 inches and a length that may be 25, 35, 50, 100 feet or longer. Length markings 24 are provided on one or both sides of blade 22 to allow the tape measure to be used to measure linear distances as is known. An end hook 26 is provided on the exposed end of blade 22 to grip objects during use and to prevent the tape from rewinding all of the way into housing 2.

Figure 2:
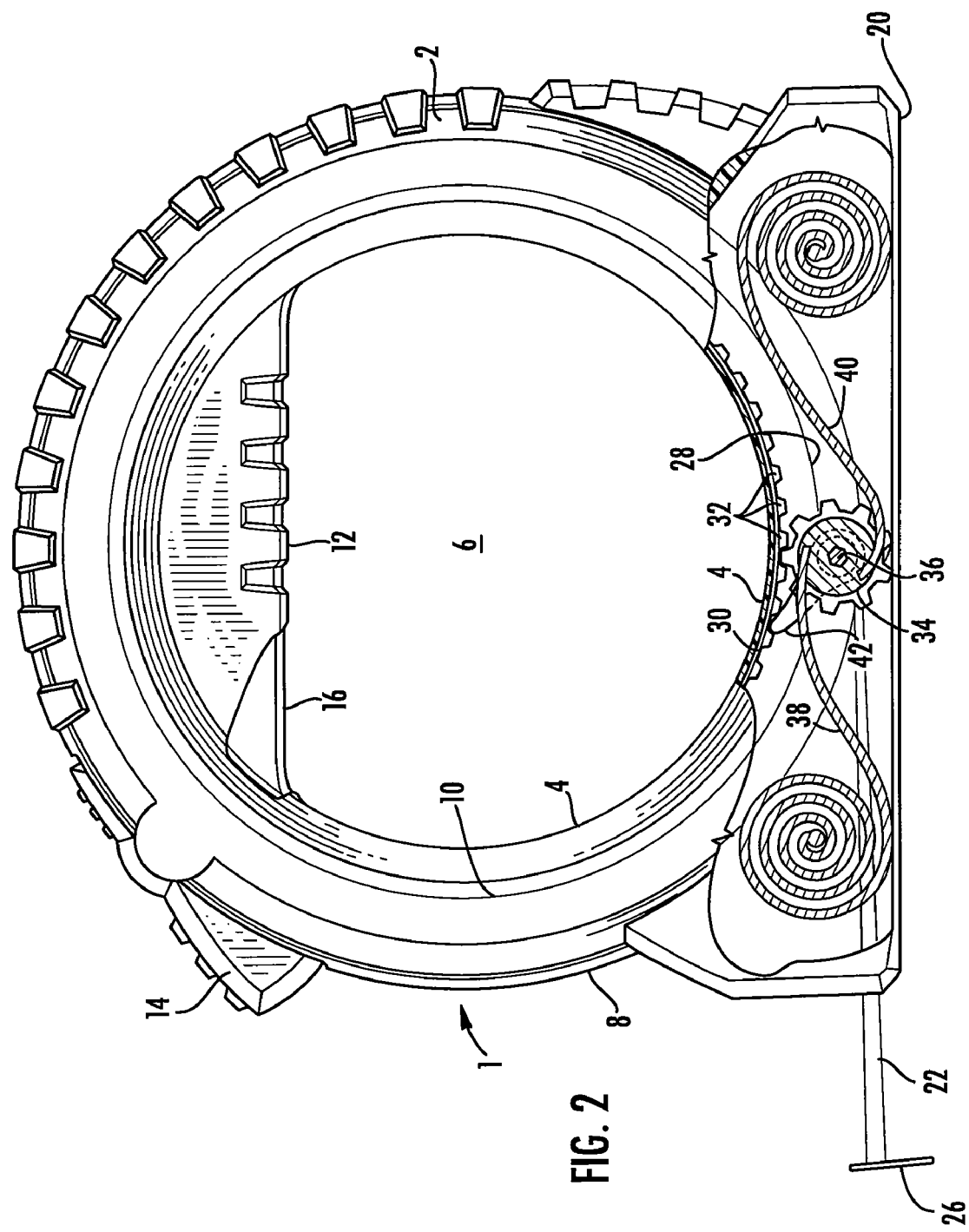

In the retracted position, blade 22 is wound in the internal annular space of housing 2. By using the annular shape a much larger and longer blade may be used while still enabling the user to comfortably grip the housing and manipulate the tape, brake lever 14 and rewind lever 16. Referring to FIG. 2 the take up reel and rewind mechanism comprising a spool or hub 28 mounted for rotation on inner wall 4. Suitable bearings may be used to minimize friction as the spool rotates such as four point nylon bearings, a four ball bearing race, pin bearings or the like. The tape blade 22 is wound on the spool 28 inside annular housing 2.

To rewind the tape into the housing a gear ring 30 may be connected to the spool 28 for rotation therewith. Gear ring 30 includes teeth 32 that mate with teeth on gear 34 mounted on axle 36 for rotation within housing 2. Gear 34 is connected to first ends of opposed torsion springs 38 and 40, the other ends of springs 38 and 40 being fixed within housing 2. When the tape 22 is extended, spool 28 and gear ring 30 rotate which, in turn, rotates gear 34 and deforms springs 38 and 40 and winds the springs on gear 34 to store energy therein. When the force is removed from tape 22 the springs 38 and 40 release the stored energy to reverse rotation of the gear 34 and rewind the tape back onto the spool 28. A one way cam lock 42 may be provided that engages teeth on gear 34 to lock the gear 34 in place and reduce the brake force required to hold the tape in the extended position. The cam lock can be released by a slight tug on the tape such that the tape can be retracted.

Figure 3:
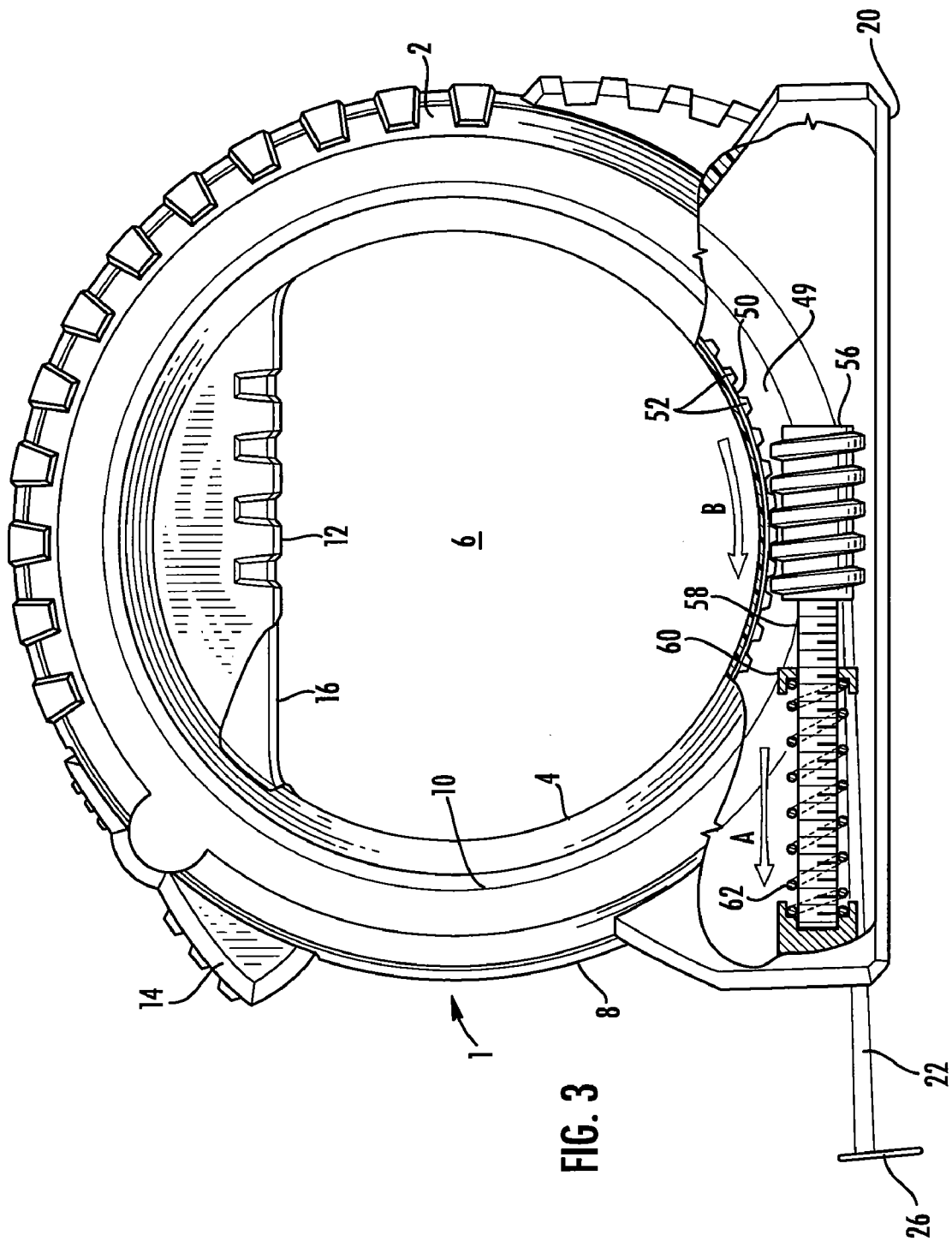

Referring to FIG. 3 a reel and rewind mechanism is shown. To rewind the tape blade 22 into the housing a spool 49 with a gear ring 50 similar to spool 28 and gear ring 30 is mounted for rotation in housing 2. Suitable bearings may be used to minimize friction as the spool rotates such as four point nylon bearings, a four ball bearing race, pin bearings or the like. The tape blade is wound on the spool 49 inside annular housing 2. Gear ring 50 includes teeth 52 that mate with worm gear 56 mounted for rotation within housing 2. Worm gear 56 is connected to threaded member 58 that, in turn, is connected to movable flange 60. When tape blade 22 is extended from housing 2, worm gear 56 is rotated by gear ring 50 as indicated by arrow B. As worm gear 56 rotates, threaded member 58 rotates to move flange 60 to the left as indicated by arrow A. A linear spring 62 is positioned between movable flange 60 and flange 62 such that as flange 60 moves in the direction of arrow A spring 62 is compressed thereby storing energy. When tape blade 22 is released, spring 62 expands to reverse rotation of worm gear 56 and rewind blade 22 on the spool.

Figure 4:
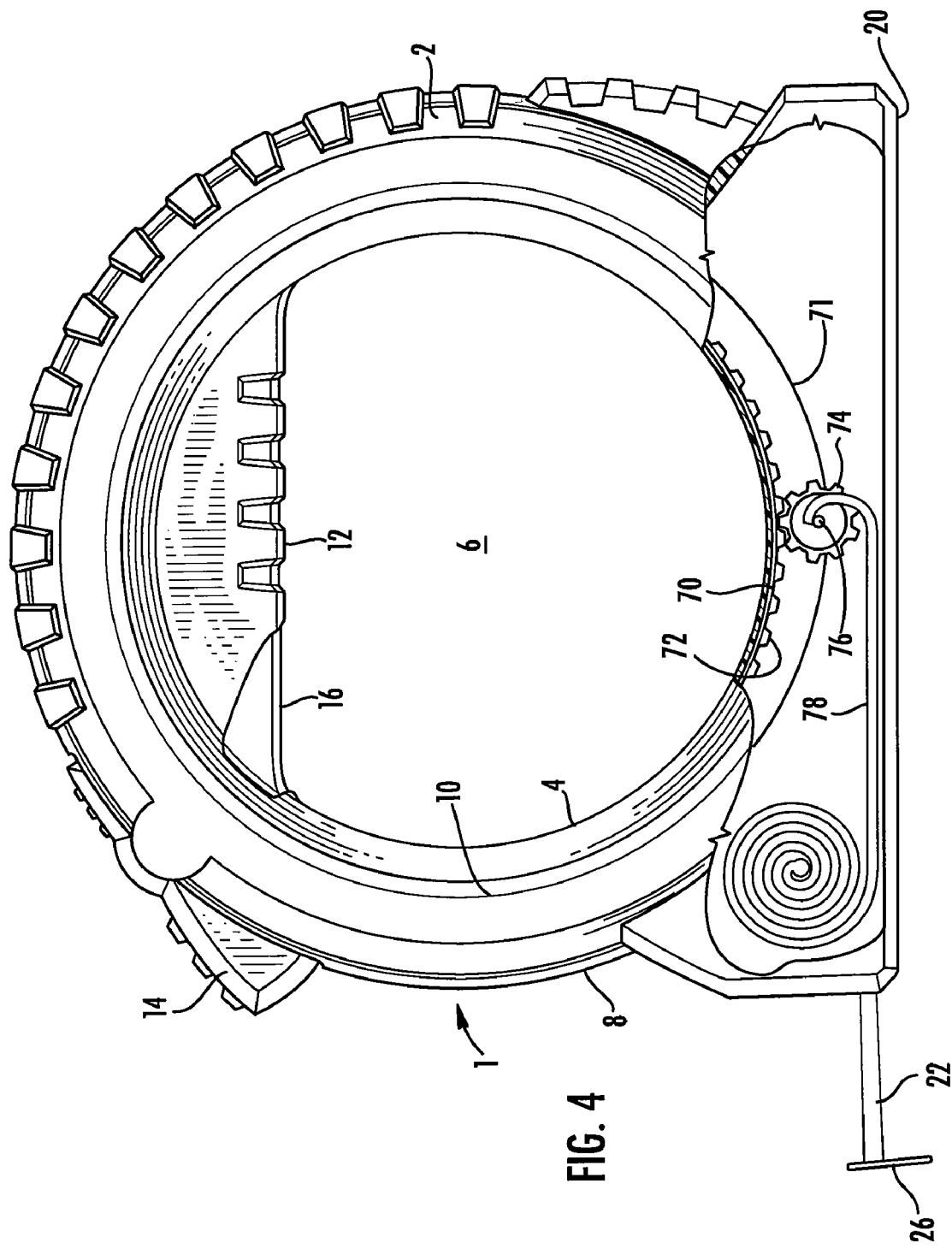

Referring to FIG. 4, another reel and rewind mechanism is shown. A gear ring 70 may be connected to spool 71 for rotation therewith. Suitable bearings may be used to minimize friction as the spool rotates such as four point nylon bearings, a four ball bearing race, pin bearings or the like. The tape blade 22 is wound on the spool inside annular housing 2. Gear ring 70 includes teeth 72 that mate with teeth on gear 74 mounted on axle 76 for rotation within housing 2. Gear 74 is connected to a first end of torsion spring 78, the other end of spring 78 is fixed within housing 2. When the tape 22 is extended, spool and gear ring 70 rotate which, in turn, rotates gear 74 to wind spring 78 on gear 74 and deform spring 78 to store energy therein. When the force is removed from tape 22 spring 78 releases the stored energy to reverse rotation of the gear 74 and rewind the tape back onto the spool.

Figure 5:
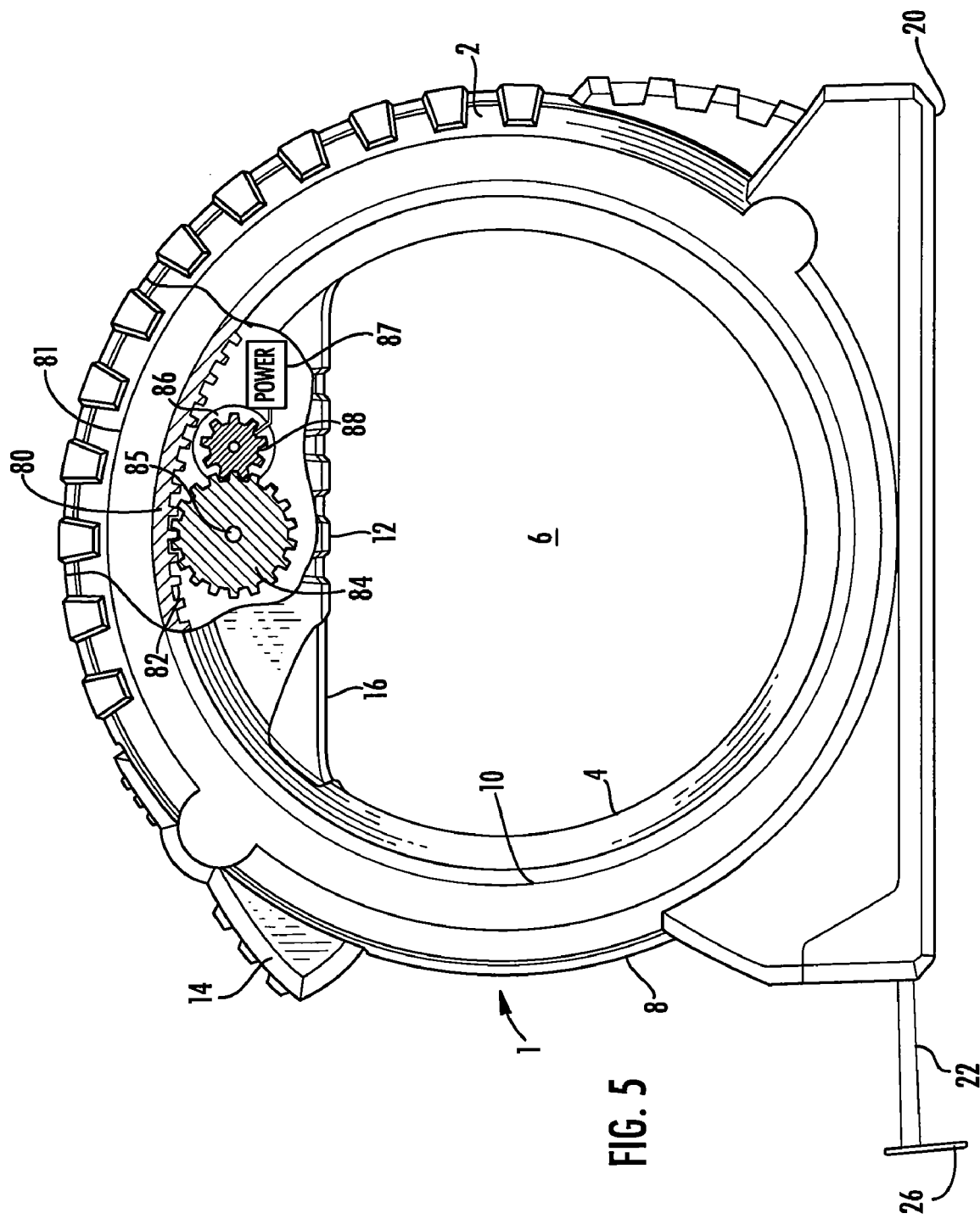

Referring to FIG. 5, yet another take up reel and rewind mechanism is shown. To rewind the tape into the housing a gear ring 80 may be connected to the spool 81 for rotation therewith. Suitable bearings may be used to minimize friction as the spool rotates such as four point nylon bearings, a four ball bearing race, pin bearings or the like. The tape blade 22 is wound on the spool inside annular housing 2. Gear ring 80 includes teeth 82 that mate with teeth on gear 84 mounted on axle 85 for rotation within housing 2. Gear 84 is connected to a motor 86 via gear 88. The motor may be a one or two way DC motor that can be used to both unwind and wind the blade 22 or the blade may be unwound manually and rewound using the motor. The motor is connected to a power source 87 such as batteries, not shown. In this embodiment the rewind mechanism is located in handle 12. It will be appreciated that the rewind mechanisms may be located anywhere within housing 2.

Figure 6:
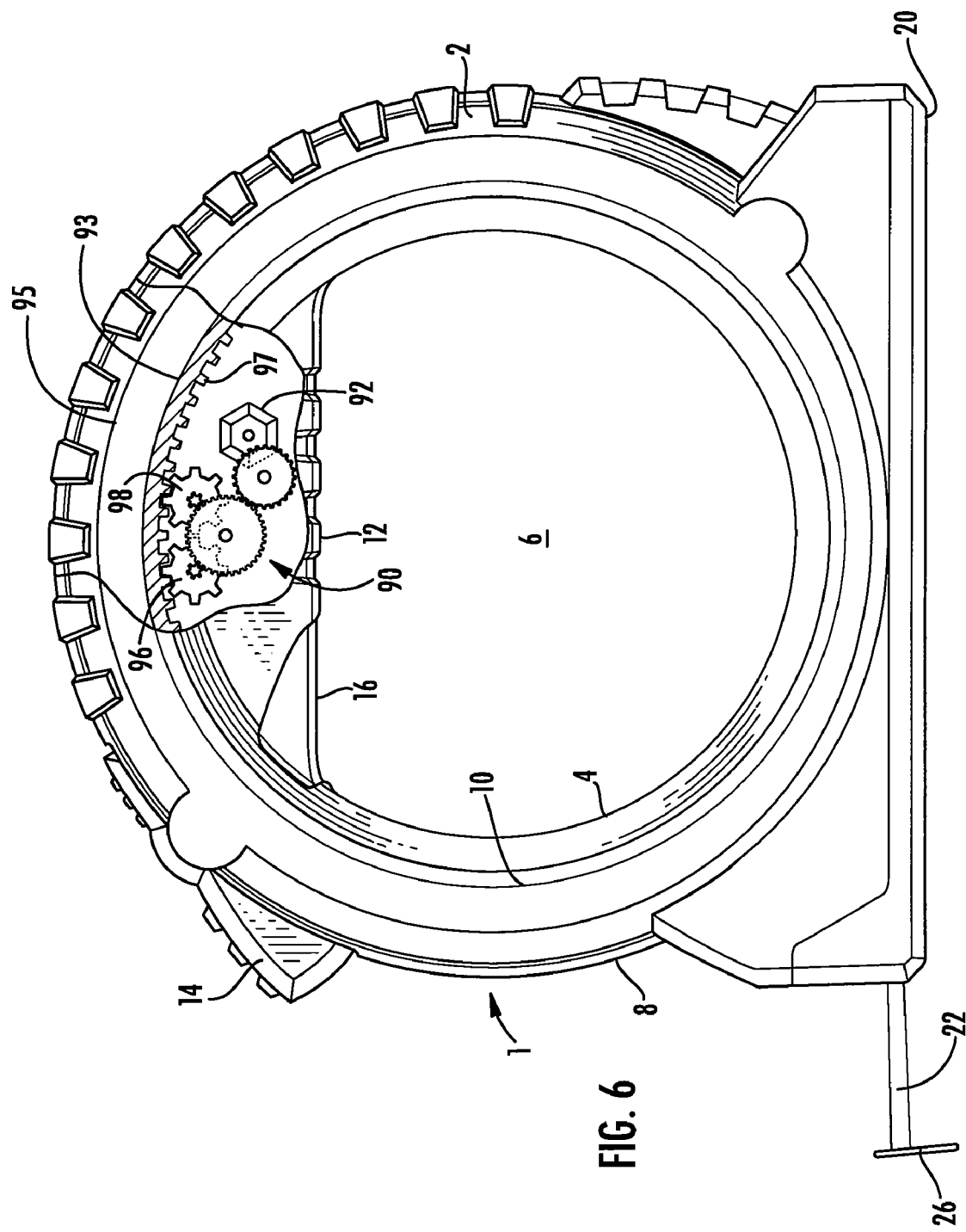

FIG. 6 shows an arrangement similar to that shown in FIG. 5 except that a planetary gear drive 90 is used with a high torque motor 92 to convert the torque to high revolutions per minute. A gear ring 93 connected to spool 95 includes teeth 97 that mate with teeth on gears 96 and 98. The motor 92 may be a one or two way motor that can be used to both unwind and wind the blade or the blade may be unwound manually and rewound using the motor. The motor is connected to a power source such as batteries, not shown.

Figure 7:
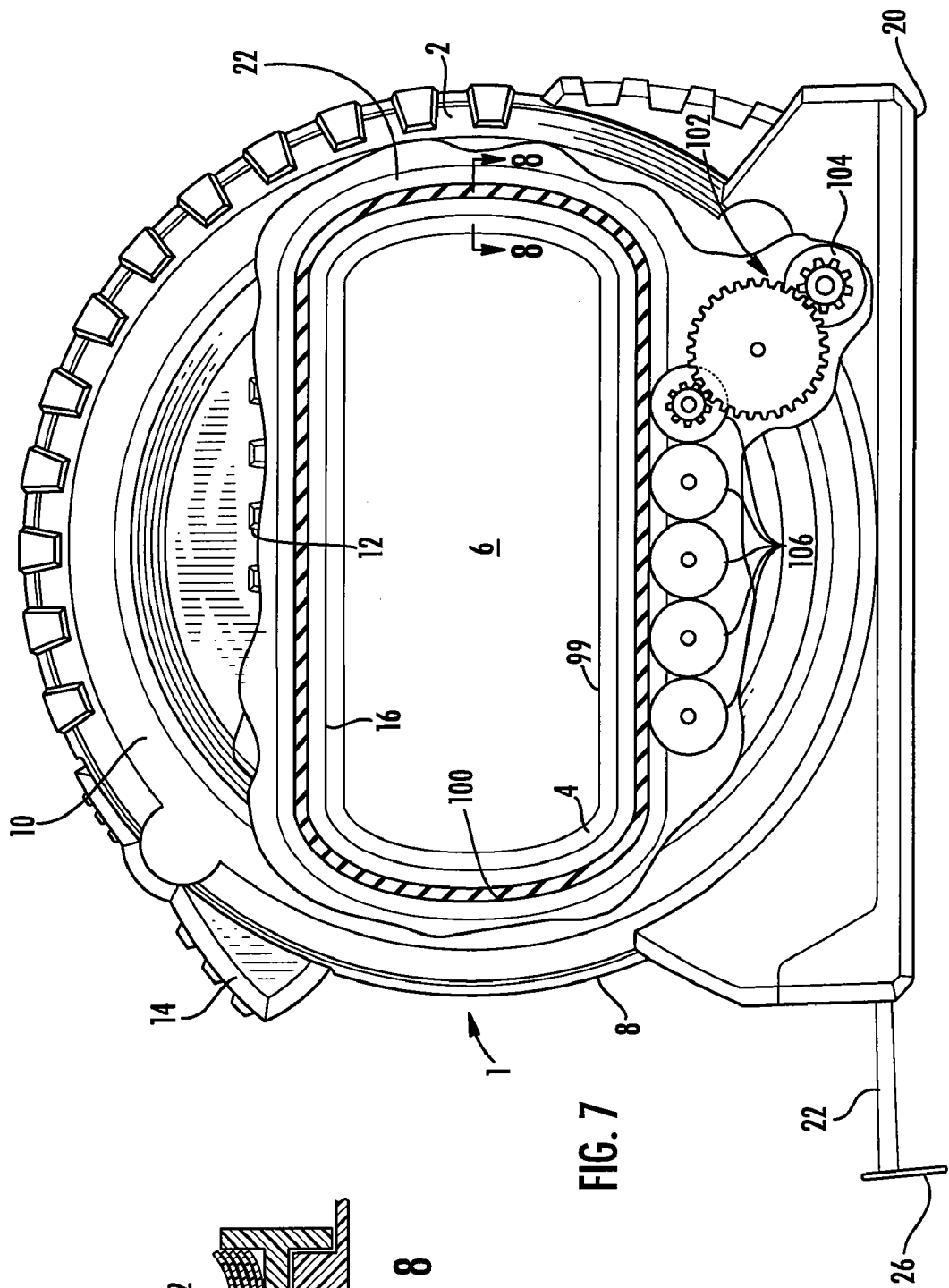
Figure 8:
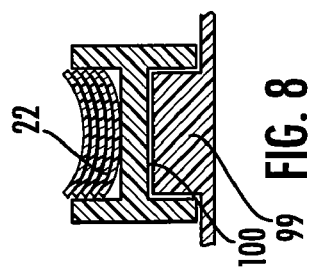
FIG. 8 is a section view taken along line A-A of FIG. 7.

FIG. 7 shows an alternate mechanism for rewinding the blade 22 comprising a flexible belt 100 made of rubber or other flexible material or construction. The belt 100 is supported on a stationary generally oval or circular base 99 and is driven by wheels 106 that are driven by gear train 102 powered by a motor 104. Motor 104 may be powered by batteries, not shown. The belt 100 has a generally H-shaped cross-section that supports blade 22 as best shown in FIG. 8. The tape 22 may be supported on belt 100 without a rigid connection such that if the tape gets hung up on an obstacle the belt 100 can move to thereby protect the wheels 106, gear train 102 and motor 104.

Figure 9:
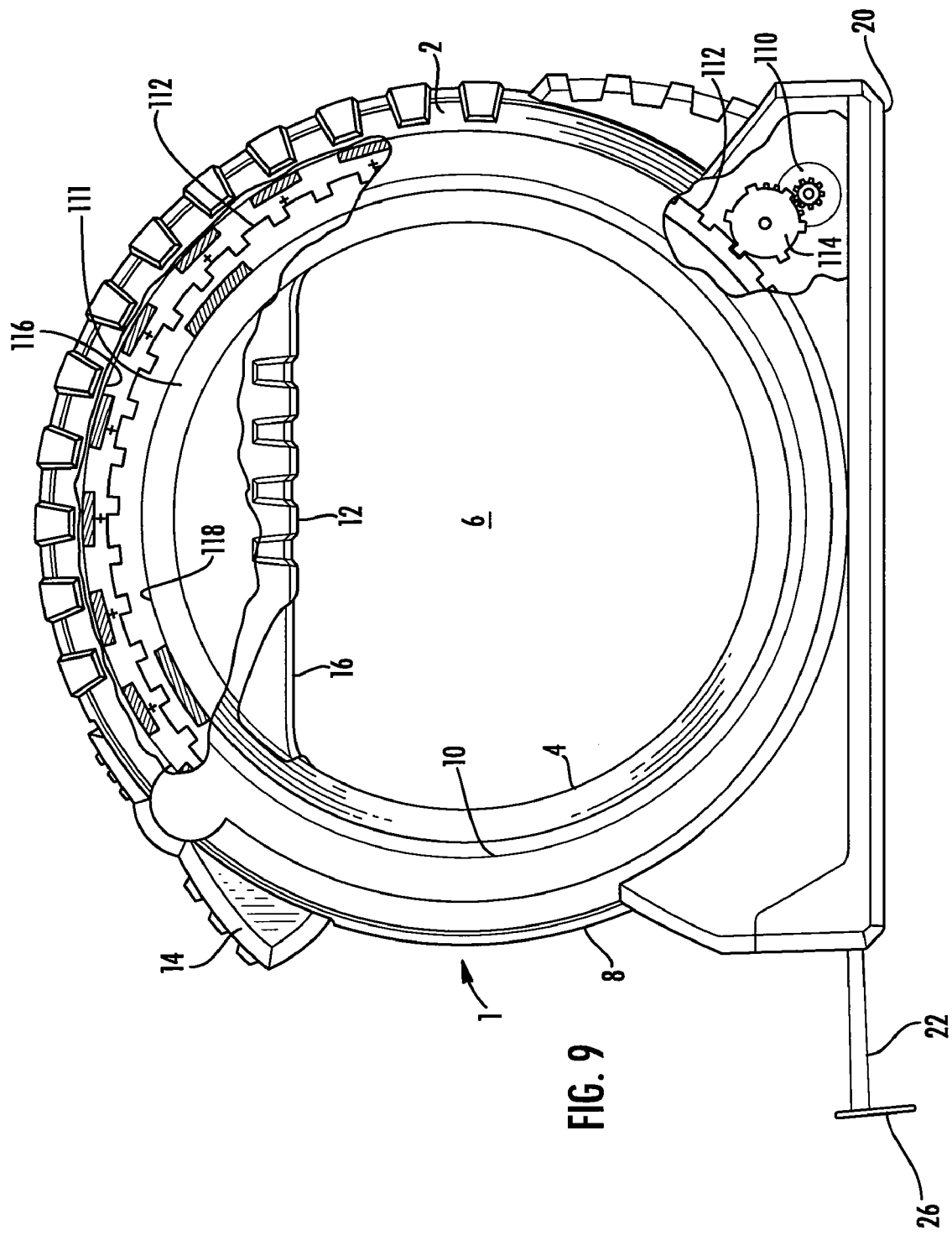

FIG. 9 shows another embodiment of the tape measure of the invention where a magnetic field is used to power the motor to retract the tape. An electric motor 110 is connected to the reel 111 via a gear ring 112 and drive train 114 or via a belt drive as previously described with respect to FIG. 7. The outer race 116 is positively charged and the inner race 118 is negatively charged. When the tape is extended the inner race that supports the tape rotates relative to the outer race such that an electromagnetic charge is created and used to power the motor 110.

FIG. 10 shows another embodiment of the tape measure of the invention 1 where a tape blade 120 is wound on the spool 121 inside annular housing 2. A spring 122 is also wound within the annular housing 2 and has one end 122a connected to the spool 121 and an opposite end 122b connected to the housing 2. When the tape blade 120 is extended from the housing the spring is deformed thereby storing energy in the spring. When the tape blade 120 is released, the spring 122 rotates the spool to retract the tape blade.

Another embodiment replaces the internal motor described in the prior embodiments with an external motor. For example, a power drill chuck could be connected to the gear or belt drives through a coupling on the tape measure housing 2. For example, gear 34 could b provided with a hex shaped female receptacle in axle 36 (as shown in FIG. 2) that can be accessed by a separate rotary drive tool such as a power drill to retract the tape blade. Axle 36 would be exposed to the exterior of the tape measure through an aperture formed in housing. The power drill could then be used as the power source to rewind the tape blade. The power source could also comprise a pneumatic compressor or a source of pressurized gas such as $CO_2$ or a solar powered energy cell. A flywheel could also be incorporated to facilitate rewinding of the blade. A viscous damper may also be used to absorb some of the energy of the rewinding tape blade. A clutch may also be used to protect the drive trains and motors in the event that the tape blade becomes snagged or otherwise unable to be rewound.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A tape measure comprising:
    a substantially enclosed housing having a substantially annular shape and including an outer wall integral with and extending from the outside diameter of the substantially annular shape, the outer wall including a flat surface, wherein the flat surface of the outer wall may be placed on another flat surface to allow the tape measure to stand upright in a fixed position, and wherein the extension of the outer wall defines a volume in addition to that defined by the substantially annular shape;
    a tape blade extending through an opening in the housing and wound in the housing; and
    an automatic retraction mechanism for retracting the tape blade into the housing, wherein the automatic retraction mechanism is substantially disposed in the additional volume defined by the extension of the outer wall.

2. The tape measure of claim 1 wherein the tape blade is wound on a spool.

3. The tape measure of claim 2 wherein the retraction mechanism includes a spring connected to the spool via a worm gear.

4. The tape measure of claim 2 wherein the retraction mechanism includes a spring connected to the spool via a gear.

5. The tape measure of claim 2 wherein the retraction mechanism includes a motor that drives a gear train connected to the spool.

6. The tape measure of claim 1 wherein the spool rotates in the housing.

7. The tape measure of claim 1 wherein the retraction mechanism includes a spring.

8. The tape measure of claim 7 wherein the spring is wound in the housing.

9. The tape measure of claim 8 wherein the spring is wound upon extension of the tape blade from the housing.

10. The tape measure of claim 7 wherein the spring is compressed upon extension of the spring from the housing.

11. The tape measure of claim 1 wherein the retraction mechanism includes a pair of flat springs operatively connected to the spool.

12. The tape measure of claim 1 wherein the retraction mechanism includes a motor.

13. The tape measure of claim 1 wherein the retraction mechanism includes a motor that drives a belt that contacts the tape blade.

14. A tape measure comprising:
a substantially annular and substantially enclosed housing dimensioned such that the housing can be gripped in one hand and including an outer wall integral with and extending from the outside diameter of the substantially annular housing, the outer wall including a flat surface, wherein the flat surface of the outer wall may be placed on another flat surface to allow the tape measure to stand upright in a fixed position, and wherein the extension of the outer wall defines a volume in addition to that defined by the substantially annular housing;
a tape blade wound in the annular housing and having an annular shape, a first end of the tape blade extending from the housing; and
means for automatically retracting the tape blade into the housing, wherein the automatic retraction means is substantially disposed in the additional volume defined by the extension of the outer wall.

15. The tape measure of claim 14 further including a hand grip formed on said housing and extending at least partially into said void.

16. A tape measure comprising:
an annular housing having an interior wall defining a generally circular void dimensioned such that fingers of one hand may extend through the void;
a hand grip including a gripping surface, the gripping surface extending generally as a chord across the generally circular void;
a tape blade wound in the annular housing, a first end of the tape blade extending from the housing through an opening in the housing; and
means for automatically retracting the tape blade into the housing,
wherein the one hand may extend around and grip the housing and the hand grip to hold the tape measure while the tape measure is operated.

17. A tape measure comprising:
a housing having an annular shape with an innermost surface generally defining an internal void, and an outermost surface generally disposed at the outer circumference of the annular shape;
a tape blade extending through an opening in the housing and wound in the housing;
an automatic retraction mechanism for retracting the tape blade into the housing;
a brake lever disposed on the outermost surface that prevents the tape blade from being retracted into the housing; and
a rewind lever disposed within the internal void that releases the brake lever to allow retraction of the tape blade into the housing,
wherein the brake lever is operable by a thumb and the rewind lever is operable by a finger of the same hand while gripping the housing.

18. The tape measure of claim 17, wherein the internal void is dimensioned such that four fingers of one hand of a user may be simultaneously extended into the void to grip the housing.

19. The tape measure of claim 17 wherein the tape blade is wound on a spool.

20. The tape measure of claim 19 wherein the spool rotates in the housing.

21. The tape measure of claim 19 wherein the retraction mechanism includes a pair of flat springs operatively connected to the spool.

22. The tape measure of claim 19 wherein the retraction mechanism includes a spring connected to the spool via a worm gear.

23. The tape measure of claim 19 wherein the retraction mechanism includes a spring connected to the spool via a gear.

24. The tape measure of claim 19 wherein the retraction mechanism includes a motor that drives a gear train connected to the spool.

25. The tape measure of claim 17 wherein the retraction mechanism includes a spring.

26. The tape measure of claim 25 wherein the spring is wound in the housing.

27. The tape measure of claim 26 wherein the spring is wound upon extension of the tape blade from the housing.

28. The tape measure of claim 25 wherein the spring is compressed upon extension of the spring from the housing.

29. The tape measure of claim 17 wherein the retraction mechanism includes a motor.

30. The tape measure of claim 17 wherein the retraction mechanism includes a motor that drives a belt that contacts the tape blade.

31. A tape measure comprising:
a substantially enclosed housing having a substantially annular shape and including an outer wall integral with and extending from the outside diameter of the substantially annular shape, the outer wall including a flat surface, wherein the flat surface of the outer wall may be placed on another flat surface to allow the tape measure to stand upright in a fixed position, and wherein the extension of the outer wall defines a volume in addition to that defined by the substantially annular shape;
A tape blade extending through an opening in the housing and wound in the housing; and
a retraction mechanism for retracting the tape measure into the housing,
wherein the retraction mechanism includes a receptacle for an external rotary drive tool to drive the retraction mechanism.

* * * * *